Nov. 15, 1960  A. J. WASLEY  2,960,372
SEALED BEARING

Filed April 16, 1958  2 Sheets-Sheet 1

INVENTOR
ARTHUR J. WASLEY,

BY *Larson and Taylor*

ATTORNEYS

Nov. 15, 1960    A. J. WASLEY    2,960,372
SEALED BEARING
Filed April 16, 1958    2 Sheets-Sheet 2
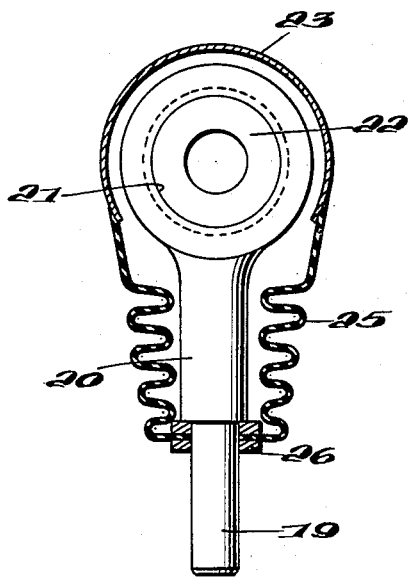
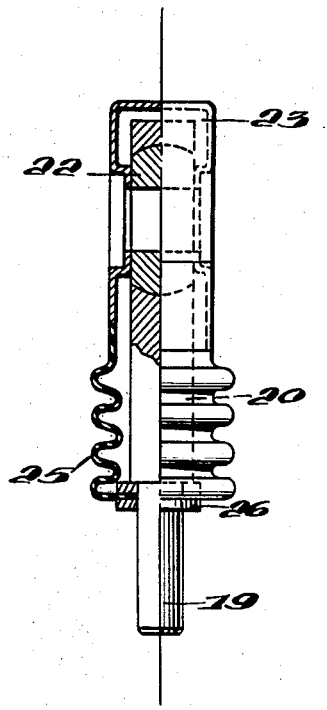
INVENTOR
ARTHUR J. WASLEY,
BY Larson and Taylor
ATTORNEYS

United States Patent Office 2,960,372
Patented Nov. 15, 1960

2,960,372

SEALED BEARING

Arthur J. Wasley, Bristol, Conn., assignor to Continental Engineering Corporation, Farmington, Conn.

Filed Apr. 16, 1958, Ser. No. 728,859

1 Claim. (Cl. 308—245)

This invention relates to a sealed bearing and more particularly to a bearing adapted to operate at high temperatures for use in airframes and the like.

Heretofore, considerable difficulty has been encountered in connection with the use of ball bearings for airframe pulleys and rod ends. Such ball bearings require lubrication and the usual grease compounds do not have the requisite temperature range. Oil systems could be used but would be exceedingly costly for such applications. Therefore, there is a very definite need in the art for a simple bearing seal which is completely effective over a wide temperature range.

According to the present invention there is provided a pulley which is completely sealed and in which the lubricating materials are under pressure so that a wider temperature range is provided. According to one modification the pulley is disposed within a casing and a wire cord fits around the pulley and extends through two openings provided in the casing. These openings are sealed by a bellows structure secured to both the casing and the wire cord. Thus, limited movement of the cord around the pulley is provided for. The casing is evacuated of air and lubricating oil and an inert gas fill the casing. The gas is under pressure so that the flash point of the oil is increased. By using an inert atmosphere corrosion problems are eliminated and standard bearing steel or tool steels may be used to fabricate the pulley rather than more expensive corrosion resistant bearing steels.

According to a modification of the invention a rod end which must be mounted for limited pivotal movement is provided with a casing which is similarly filled with oil and an inert gas so as to increase the operating temperature range of the bearing.

An object of the present invention is to provide a sealed bearing for pulleys and rod ends which are particularly well suited for high temperature applications.

A further object of the present invention is to provide a pulley and rod end which are completely encased wherein the lubricating fluid is under pressure so that the operating temperature may be substantially increased.

Other objects and many of the attendant advantages of the present invention will become apparent upon consideration of the following detailed specification in connection with the accompanying drawings wherein:

Fig. 3 is a sectional view showing the broad end in elevation,

Fig. 4 is a partial cross-sectional view and side elevation of the rod end casing, and Fig. 5 is a perspective view of one of the mounting elements for the rod.

Figure 1:
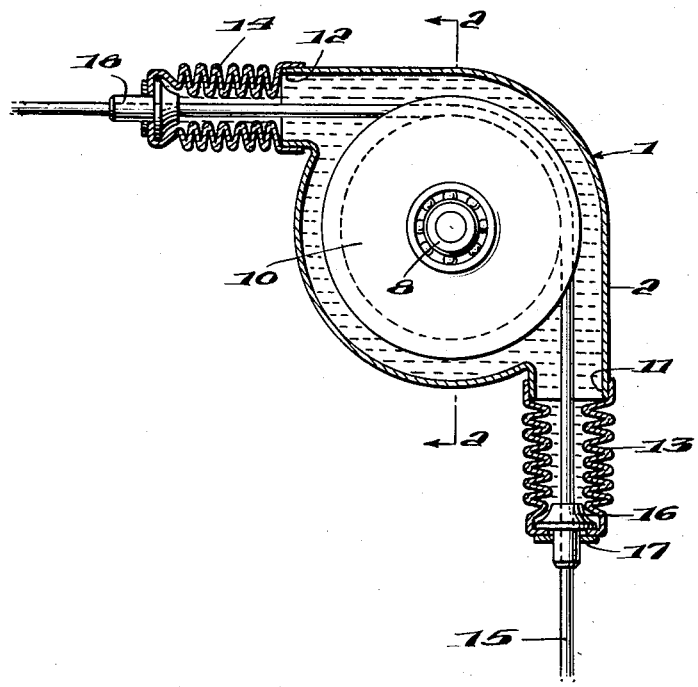
Fig. 1 is a sectional view showing the pulley in elevation.
Figure 2:
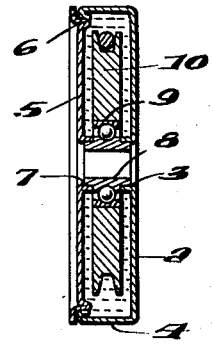
Fig. 2 is a cross-sectional view along the line 2—2 of Fig. 1.

Referring now to the drawings wherein like numerals indicate like parts throughout the several views there is shown at 1 in Fig. 1 a casing. This casing is formed of two members as shown in Fig. 2 and these members comprise a plate 2 having a flanged central opening 3 with a peripheral flange 4. A cover plate 5 has an inwardly extending beaded rim 6 which cooperates with the flange 4 to form an air-tight casing 7. A cover plate 5 has a central flanged opening 7 and the flanges 3 and 7 cooperate to securely grip the inner race 8 of a ball bearing. The outer race 9 of the ball bearing is in frictional engagement with the grooved pulley wheel 10.

As shown in Fig. 1 the member 2 is provided with ports 11 and 12 and secured around these ports are bellows 13 and 14 respectively. A wire cable 15 passes through the ports 11 and 12 and around a portion of the periphery of the pulley 10. Cable 15 is secured to the bellows 13 by means of a bolt 16 having a nut 17 disposed thereon. The outer periphery of the bellows is engaged between the head on the bolt 16 and the nut 17 and the bolt is in tight frictional engagement with the cable which passes therethrough. A bolt 18 provides means for similarly gripping the bellows 14.

The chamber formed by the casing and bellows is completely air-tight and air is evacuated so that the chamber may be filled with oil and an inert gas so that the oil will be under pressure. Alternatively, the entire chamber could be filled with oil. It is preferable, however, to place the oil under pressure so as to raise the operating temperature range of the pulley. By completely enclosing the pulley and bearing in an air-tight housing and by evacuating the chamber of air, corrosion problems are substantially eliminated. Thus, it is unnecessary to use the corrosion resistant steel and standard bearing steel and tool steel may be utilized.

In Figs. 3 to 5 there is shown a bearing for a rod end wherein the rod is shown at 19 and this rod is provided with an end fitting 20 formed with an eyelet 21. Fitted within this eyelet is a bearing 22. The end fitting and bearing are disposed within the housing or shell member 23 which is shaped in the manner shown in Fig. 5. It can be seen that the shell member has an arcuate cut-out portion 24 through which the rod end extends. A resilient bellows 25 is secured to the shell around the periphery of this cut-out portion and the bellows is secured to the rod end by means of nuts 26. The housing or casing enclosing the bearing and rod end fitting is completely air-tight and may be evacuated and filled with a lubricant such as oil or may be filled with a lubricant and inert gas so that the lubricant is placed under pressure. This structure may be used in airframe designs wherein corrosion resistance and high temperature applications are significant.

Obviously many modifications and variations of the present invention are possible in light of the above teachings. What is claimed as new and desired to be secured by Letters Patent is:

A sealed bearing for a movable member comprising a bearing, a housing surrounding said bearing and having portions thereof engaging opposing faces of said bearing, one side of said housing having an arcuate opening, an apertured rod end fitting on said bearing, said rod end fitting extending through the arcuate opening whereby said rod end fitting is adapted to pivot on said bearing within said housing and a bellows secured to said housing and said rod end fitting to provide an airtight casing.

References Cited in the file of this patent

UNITED STATES PATENTS

| | | |
|---|---|---|
| 1,397,413 | Evans | Nov. 15, 1921 |
| 1,452,431 | Milkie | Apr. 17, 1923 |
| 2,255,172 | Johnson | Sept. 9, 1941 |
| 2,462,659 | Molotzak | Feb. 22, 1949 |
| 2,707,645 | Moskovitz | May 3, 1955 |